Aug. 11, 1964   F. S. HALUSKA ETAL   3,143,808
APPARATUS FOR OPTICAL GAGING
Filed Nov. 16, 1960   4 Sheets-Sheet 2
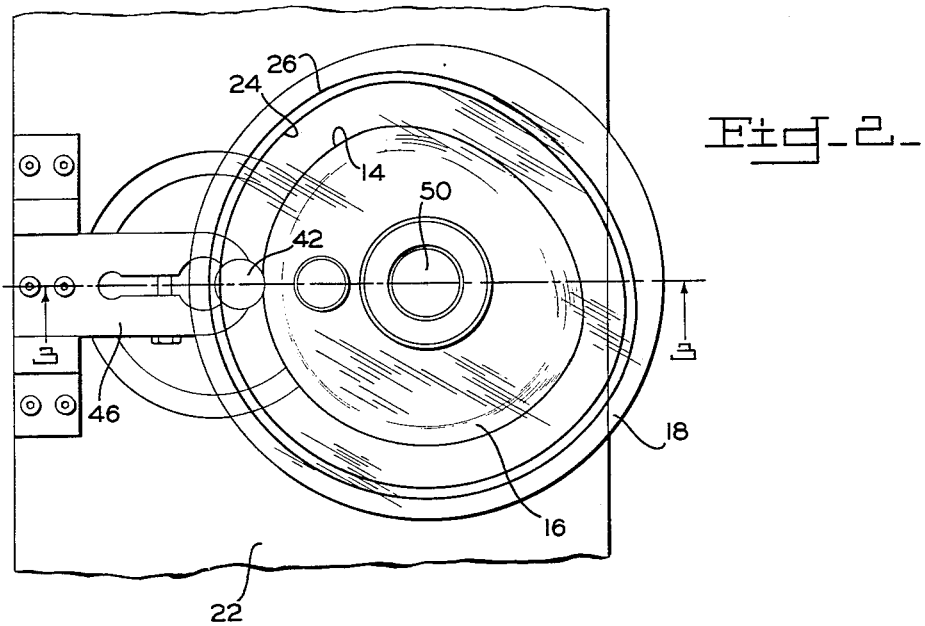
Fig-2-
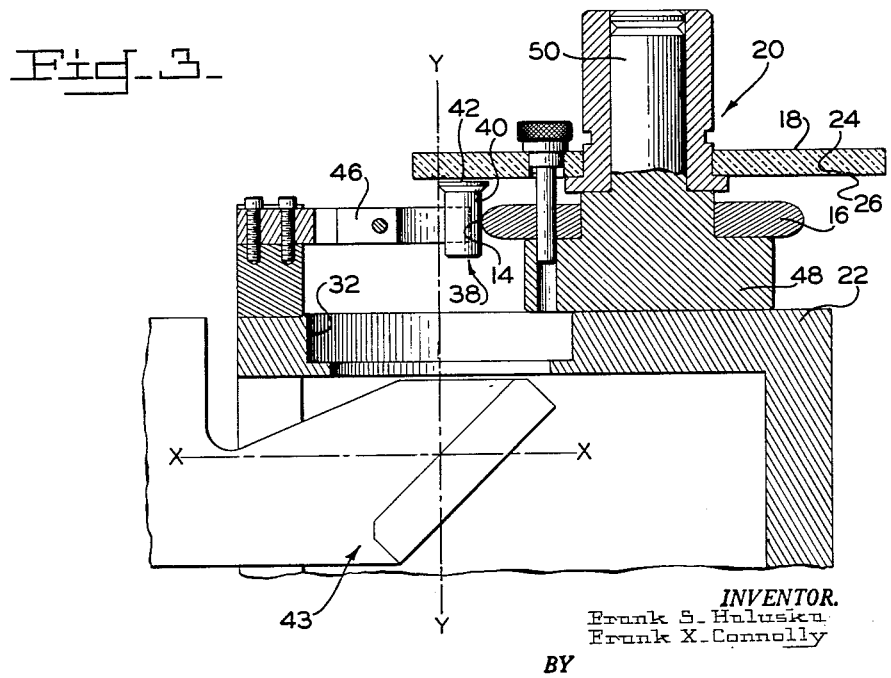
Fig-3-
INVENTOR.
Frank S. Haluska
Frank X. Connolly
BY
S. J. Rotondi & A. T. Dupont

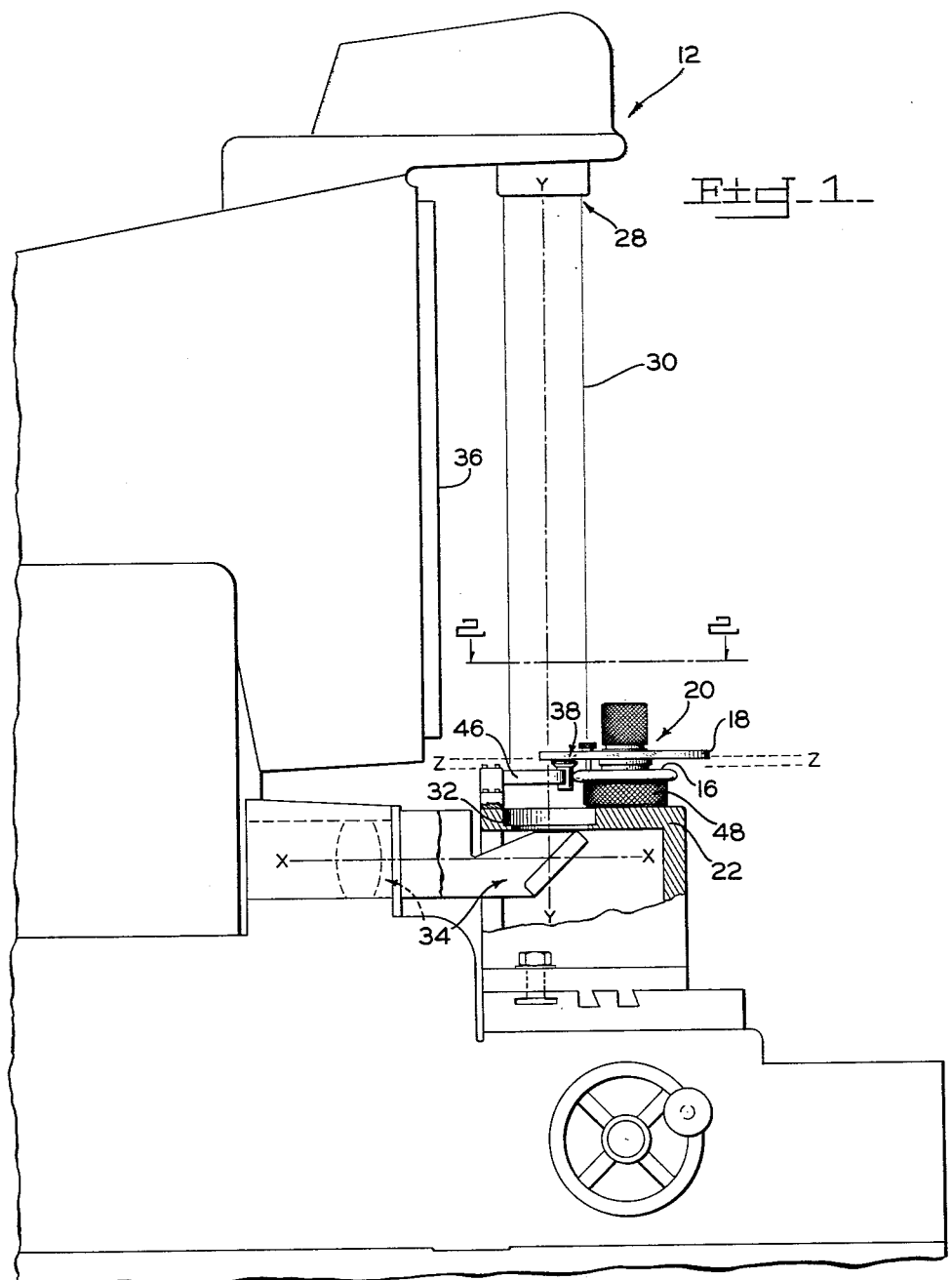

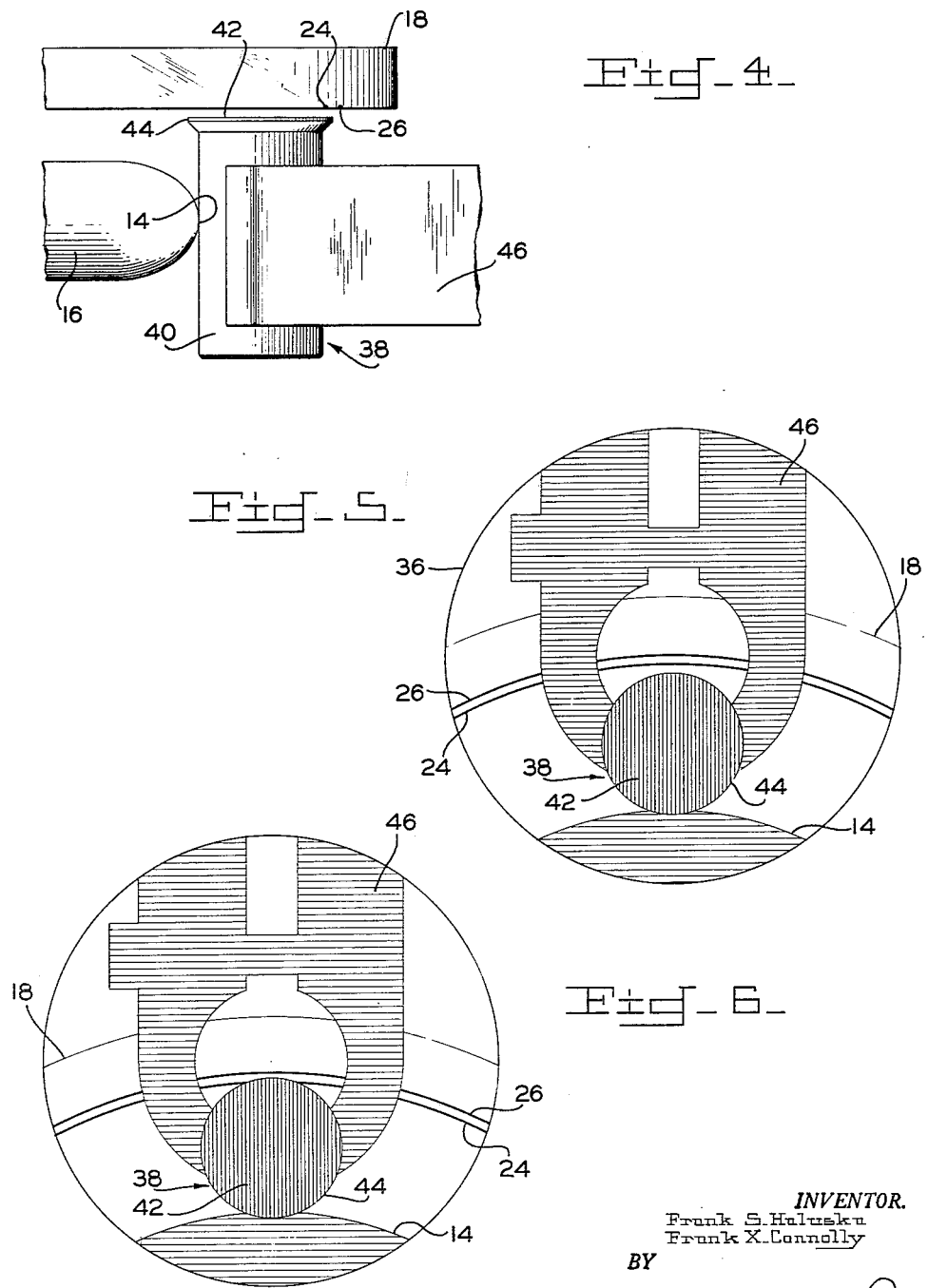

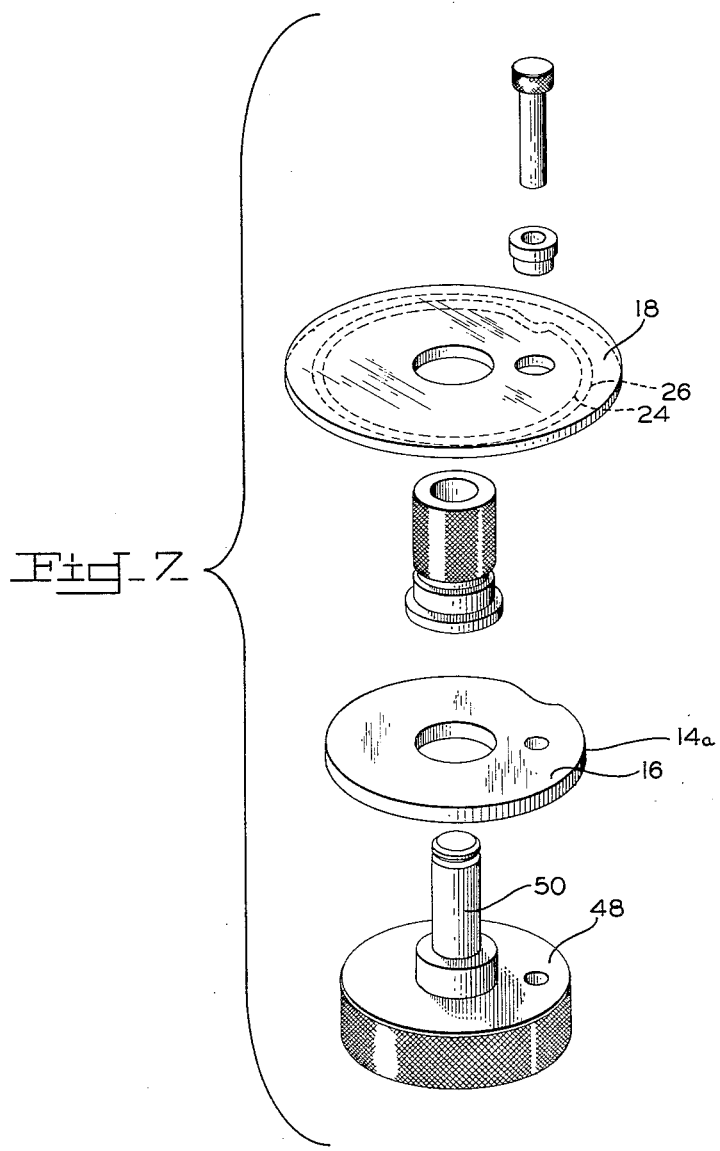

3,143,808
Patented Aug. 11, 1964

3,143,808
APPARATUS FOR OPTICAL GAGING
Frank S. Haluska, 14 Tipton Drive, Loudonville, N.Y., and Frank X. Connolly, 714 3rd Ave., Troy, N.Y.
Filed Nov. 16, 1960, Ser. No. 69,781
7 Claims. (Cl. 33—174)
(Granted under Title 35, U.S. Code (1952), sec. 266)

The invention described herein may be manufactured and used by or for the Government for governmental purposes without the payment of any royalty thereon.

This invention relates to apparatus for visually gaging through optical means the contours of a workpiece and pertains more specifically to such apparatus wherein the contours are referred to a master on which there are inscribed a pair of reticles which represent the minimum and maximum limits permitted the gaged contour with the contour and reticles being magnified and projected on a screen to facilitate the observation of the relationship therebetween.

Such apparatus, as has been available heretofore, has had the workpiece with the contour to be gaged and the reticled master fixedly mounted on the comparator at different points and, therefore, has required elaborate and expensively manufactured mechanical linkage for mounting a feeler, which must be movable in all directions in a given plane for probing the contour, and a reference follower, which must duplicate exactly the movement of the feeler, so as to relate the contour to the reticles on the master for simultaneous projection upon the comparator screen.

It is an object of this invention to provide an optical gaging apparatus of the stated type wherein the feeler and reference elements are integrally formed on a single member to increase the accuracy of the apparatus by eliminating the mechanical linkage interposed therebetween as any mechanical linkage is subject to wear and must have some tolerance at the connection points to permit relative movement between the links.

It is another object of this invention to provide such an optical gaging apparatus in which all mechanical linkage is eliminated for simplicity of operation and reduction in cost of manufacture and in which greater accuracy is obtained by locating both the reference reticles and the contour to be gaged or an extension thereof within spatial limits equal to the depth of focus of the comparator and mounting the workpiece and master together in a fixture so that the reticles and master may be entirely passed through the light beam of the comparator.

It is a further object of this invention to provide such an optical gaging apparatus which does not limit the size of the workpiece to be gaged.

The specific nature of the invention as well as other objects and advantages thereof will clearly appear from a description of a preferred embodiment as shown in the accompanying drawings in which:

FIG. 1 is a side view of a comparator with a workpiece having a radial contour to be inspected mounted on the comparator for optical gaging;

FIG. 2 is an enlarged view taken along line 2—2 of FIG. 1;

FIG. 3 is a view taken along line 3—3 of FIG. 2;

FIG. 4 is an enlarged view of the stylus;

FIG. 5 is the picture as seen on the comparator screen when the contour being gaged is undersize at the point where contacted by the stylus;

FIG. 6 is a view similar to FIG. 5 but showing the picture when the contour is within permissible limits; and FIG. 7 is an exploded view of the fixture for holding the master and workpiece and showing a workpiece in which the contour to be gaged is provided with a straight face.

Shown in the figures is a comparator 12 for gaging through optical means a radial contour 14 of a workpiece 16 by visually comparing the contour with a reticled transparent master 18. Master 18 and workpiece 16 are both retained by a fixture 20, which is best illustrated by FIG. 3 and which will be more fully described hereinafter, so as to be accurately indexed together therein, and the fixture is slidingly supported by a horizontally disposed platform 22 on comparator 12. The reticles inscribed on master 18 include a minimum reticle 24 and a maximum reticle 26 which indicate, respectively, the undersize and oversize limits within which contour 14 must be formed to meet predetermined gaging standards.

Comparator 12, of conventional design, is provided with a light source 28 which projects a light beam 30 vertically downward through an opening 32 in platform 22 to an optical system 34 in which center line $x$—$x$ thereof intercepts center line $y$—$y$ of the light beam. Optical system 34 magnifies the intercepted light beam 30 and the configuration of any object which partially intercepts the light beam and projects the magnified configuration in silhouette onto a screen 36. The depth of focus of optical system 34 is noted at $z$—$z$ and platform 22 is adapted for vertical elevation so as to bring reticles 24 and 26 within such depth of focus for sharp definition on screen 36.

For accurate gaging, reticles 24 and 26 and the contour to be gaged must be located in depth of focus $z$—$z$ so as to produce a sharp image on screen 36. Oftentimes, however, the contour is located on a workpiece or is angularly or radially formed, as is the case of contour 14, so that this is not possible without extending the contour by extraneous means into the depth of focus. Here the perimeter of the largest cross-section area of workpiece 16 is spaced more than a distance equal to depth of focus $z$—$z$ from reticles 24 and 26 and, therefore, must be extended closer to the reticles. This is achieved by a stylus 38 which includes a cylindrical feeler portion 40 which is terminated by a concentric head 42. Head 42 has a diameter slightly larger than that of feeler portion 40 and the underside is tapered to provide a relatively narrow peripheral edge 44. Stylus 38 is fixed to platform 22 by a clamp 46 which holds the stylus vertically and so that edge 44 falls within light beam 30 as shown in FIGS. 1 and 3. Contour 14 is contactable by feeler portion 40 and the point where the contour is contacted by the feeler portion is extended thereby into depth of focus $z$—$z$ where it is represented on screen 36 by edge 44 of head 42. Reticles 24 and 26 are located on master 18 to compensate for the differences in the diameters of feeler portion 40 and head 42.

Head 42 with its relatively narrow edge 44 is provided as a reference in visually comparing contour 14 with reticles 24 and 26 because without it light beam 30 would reflect sufficiently from the surface of feeler portion 40 to diffuse the edge thereof silhouetted on screen 36 and thereby provide an unsuitable reference unless feeler portion 40 was disposed absolutely parallel to center line $y$—$y$ of light beam 30.

Fixture 20 is designed so that, when workpiece 16 is mounted thereon, stylus 38 may probe the entire contour 14 through the sliding contact thereof with feeler portion 40 so that light beam 30 may pass through master 18 in the area of the stylus without interference by the fixture. In the present embodiment where workpiece 16 is a cam which is essentially circular in configuration and contour 14 to be gaged is the perimeter of the workpiece, fixture 20 includes a circular base 48 which has a diameter sufficiently smaller than that of the workpiece so as not to interfere with the contact of feeler portion 40 of stylus 38 with the contour. A shaft 50 extends axially from base 48 and workpiece 16 and master 18 are mounted thereon, as shown in FIG. 7, by means of central holes therethrough with suitable means provided for securing the workpiece and master in an indexed relationship.

In operation, workpiece 16 and master 18 are accurately indexed together on fixture 20 which is placed on platform 22. Platform 22 is adjusted to bring reticles 24 and 26 within depth of focus $z$—$z$ and stylus 38 is then adjusted in clamp 46 to bring edge 44 also within the depth of focus. Whereby, reticles 24 and 26 and edge 44, which are the reference elements to be visually observed in the gaging of contour 14, are sharply defined on screen 36.

Fixture 20 is slidingly moved on platform 22 to bring contour 14 into contact with feeler portion 40 of stylus 38 and is then manually moved around on platform 22 until the entire length of contour 14 has been probed by the stylus. While contour 14 is being probed, screen 36 is watched to observe the relationship of the silhouette cast by head 42 with minimum reticle 24 and maximum reticle 26.

If, during the probing of contour 14, minimum reticle 24 is interrupted by the silhouette of head 42 but maximum reticle 26 is not, as shown in FIG. 6, contour 14 is within permitted limits and is correctly formed. However, if the silhouette of head 42 should at any point interrupt both minimum reticle 24 and maximum reticle 26, contour 14 is oversize at the point thereof in contact with feeler portion 40 and, if the silhouette of the head fails to interrupt the minimum reticle, as shown in FIG. 5, the contour is undersize at that point.

The benefits of the invention, as illustrated by the above described embodiment, are obvious. The need for elaborate staging for holding the tracing stylus has been eliminated by having stylus 38 held stationary by clamp 46 and by having fixture 20 freely supported on platform 22 for movement thereon relative to the stylus. Moreover, improved accuracy, simplicity, and reduction in manufacturing costs have been achieved here with the feeler and reference portions being integrally provided on the same member to eliminate the mechanical linkage which connects the probe and reference members in the conventional devices.

Moreover, even greater simplicity may be achieved where the contour to be gaged is straight, as noted at 14a in FIG. 7, rather than radially formed as with contour 14. In such instances, the perimeter of the cross-section which is adjacent reticles 24 and 26, when workpiece 16 is mounted on fixture 20, represents the configuration of contour 14a and is spaced from the reticles within limits equal to depth of focus $z$—$z$. Therefore, contour 14a and the reticles 24 and 26 will be sharply represented on screen 36 when passed through light beam 30 so that the relationships between the reticles and the contour can be readily observed.

It is readily apparent that, in both this embodiment and the one previously explained in which contour 14 is extended by stylus 38, the apparatus of this invention will gage workpieces of any cross-sectional size as long as the workpiece and the reticled master can be indexed together and the reference reticles and the contour to be gaged or an extension thereof provided by the stylus, can be passed through the light beam of the comparator.

Although particular embodiments of the invention have been described in detail herein, it is evident that many more variations may be devised within the spirit and scope thereof and the following claims are intended to include such variations.

We claim:

1. An apparatus for gaging a given contour of a workpiece by comparing the contour with predetermined standards, said apparatus including a light source for producing a light beam, an optical system with a given focal distance and depth of focus, said optical system being adapted for projecting the light beam under magnification onto a screen, a stylus mounted against lateral movement on a horizontally disposed platform, said stylus being disposed for sliding contact by the contour when the workpiece is placed on said platform and designed for representationally extending the contour into the depth of focus of said optical system, and a reticled master fixedly indexed to the workpiece for free displacement therewith on said platform within the depth of focus, and said reticled master and the workpiece being so related that the projected stylus and reticled master can be meaningfully compared on said screen.

2. The apparatus as defined in claim 1 wherein said stylus is provided with a cylindrical feeler portion and a concentric head of larger diameter, and wherein the apparatus includes a clamp mounted on said platform, said clamp being adapted to hold said stylus so that the contour is contactable with said feeler portion and said head is locatable in the depth of focus of said optical system.

3. The apparatus as defined in claim 2 wherein said master is provided with a pair of reticles representing the minimum and maximum limits within which the contour must be formed to meet the predetermined standards and said pair of reticles are located on said master to compensate for the differences in the diameters of said head and feeler portion.

4. An apparatus for gaging a given contour of a workpiece according to predetermined standards, the apparatus including a light source for projecting a light beam, a magnifying optical system disposed for intercepting the light beam and adapted for projecting the magnified light beam upon a screen, a transparent master inscribed with a pair of reticles respectively representing the minimum and maximum limits within which the contour must be formed to meet the predetermined standards, a fixture for retaining said master and the workpiece together in indexed relationship respective to the contour and said pair of reticles, means for supporting said fixture for free sliding movement perpendicular to the center line of the light beam, and a stylus disposed for contact by the contour for probing the length thereof, said stylus being located so as to interrupt the light beam and designed to relate the contour through the silhouette of said stylus projected upon said screen to a projection of said pair of reticles thereon as said fixture is manipulated on said supporting means therefor to move the contour along said stylus.

5. The apparatus as defined in claim 4 wherein said optical system has a given depth of focus and the apparatus includes means for positioning said master and said stylus simultaneously into the depth of focus for sharp definition of said reticles and the silhouette of said stylus on said screen as said fixture is manipulated on said supporting means therefor to move the contour along said stylus.

6. The apparatus as defined in claim 5 and including a clamp mounted on said fixture supporting means, said clamp being adapted to hold said stylus parallel to the center line of the light beam and in the path thereof.

7. An apparatus for gaging a given contour according to predetermined standards, the apparatus including a light source for producing a vertical light beam, a magnifying optical system having a given focal distance and depth of focus, said optical system being disposed to intercept the light beam for projection upon a screen, an elevationally adjustable platform horizontally disposed in the path of the light beam and below the depth of focus, an opening in said platform to permit passage of the light beam to said optical system, a stylus including a cylindrical feeler portion and a concentric head of larger diameter, a clamp mounted on said platform for holding said stylus vertically and so as to be adjustable for locating said head within the depth of focus, a transparent master provided with a maximum reticle and a minimum reticle indicating the limits of the predetermined standards, said reticles being formed to compensate for the difference in the diameters of said feeler portion and said head, and a fixture adapted for retaining said master and the workpiece together in indexed relationship and for free movement on said platform so that the contour is contactable along the length thereof with said feeler portion, whereby when said platform is adjusted to locate said master within the depth of focus and said stylus is adjusted in said clamp to locate said head within the depth of focus a silhouette of said head and said reticles are sharply defined on said screen and the relationship of the contour to the predetermined standards are visually notable on said screen by the relationship of the silhouette of said head to the projected representations of said maximum and minimum reticles as said contour is moved along said feeler portion.

References Cited in the file of this patent
UNITED STATES PATENTS

| | | |
|---|---|---|
| 2,476,312 | Luety | July 19, 1949 |
| 2,883,905 | Crook et al. | Apr. 28, 1959 |
| 2,949,057 | Polidar | Aug. 16, 1960 |